June 14, 1932.   W. M. ELKINS   1,863,007
LATHE ATTACHMENT
Filed April 11, 1931   2 Sheets-Sheet 1

Inventor
William M. Elkins
By
Wilkinson & Mawhinney
Attorneys.

June 14, 1932.  W. M. ELKINS  1,863,007
LATHE ATTACHMENT
Filed April 11, 1931    2 Sheets-Sheet 2
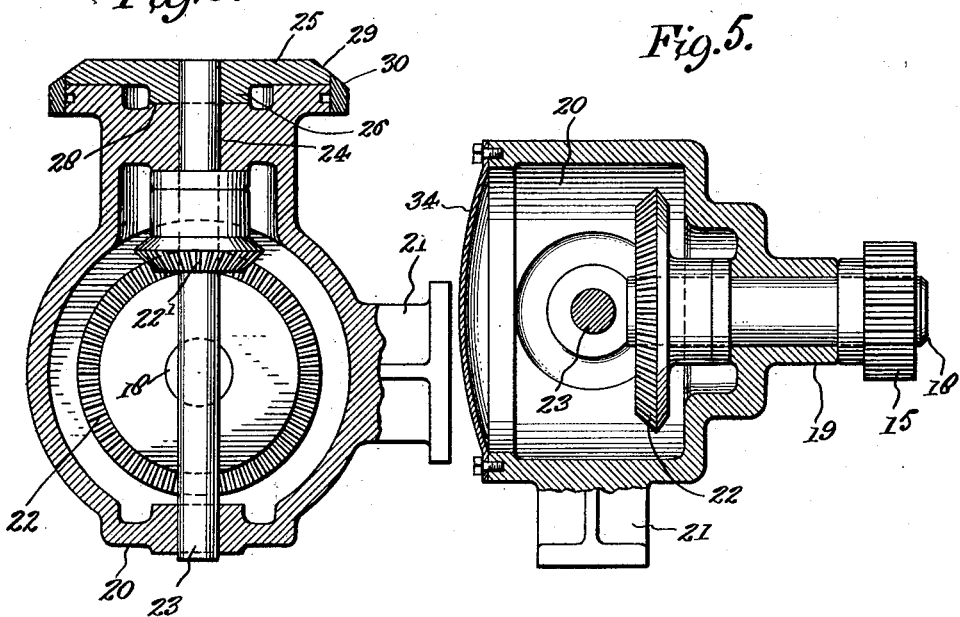
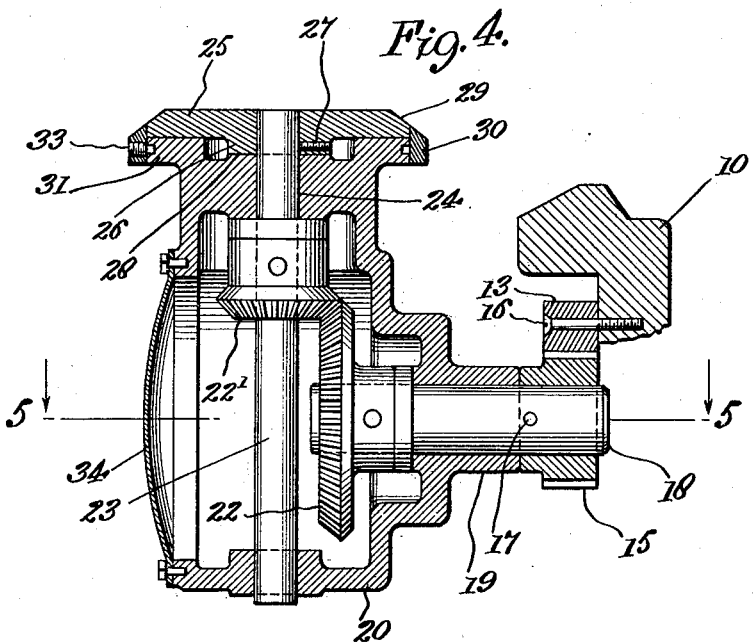
Inventor
William M. Elkins
By Wilkinson & Mawhinney
Attorneys.

Patented June 14, 1932

1,863,007

UNITED STATES PATENT OFFICE

WILLIAM M. ELKINS, OF WINCHESTER, INDIANA

LATHE ATTACHMENT

Application filed April 11, 1931. Serial No. 529,525.

The present invention relates to improvements in lathe attachments, and has for an object to provide an improved lathe attachment which will function to indicate positively to the operator the exact distance that the tool holder has moved in either direction with reference to the lathe bed.

The usual method for gauging or measuring the linear or longitudinal depth of a cut to be taken on a lathe requires, where accuracy is demanded, that the operator stop his machine, and gauge or measure this depth with a scale or other precision tool.

This is a loss of time and an inefficient method. It is the purpose of the present invention to provide an improved attachment for the lathe in which the depth of the cut to be taken is measured and indicated with extreme accuracy by a graduated dial of the device, and without stopping the machine, whereby there results greater production on that particular machine due to the elimination of the stop periods.

A further object of the invention is to provide an improved gauging and measuring device, whereby numberless spoiled jobs will be avoided.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a fragmentary side view of portions of a lathe showing the improved attachment.

Figure 3 is a vertical section taken on the line 3—3 in Figure 2.

Figure 4 is a vertical section taken on the line 4—4 in Figure 1, and

Figure 5 is a horizontal section taken on the line 5—5 in Figure 4.

Figure 1:
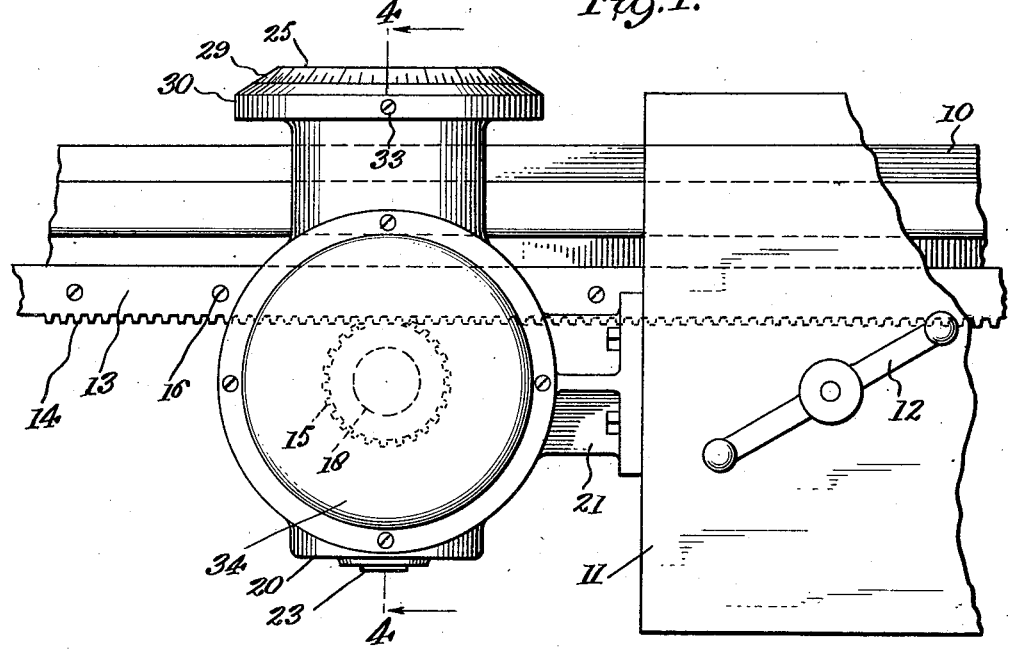

Referring more particularly to the drawings, 10 designates the ways or longitudinal sections of a lathe. These ways or sections support the movable tool holder 11. The tool holder has the usual operating handle 12 by which it is advanced along the lathe frame usually by means of a pinion and rack not shown, as the same form no part of the present invention.

The lathe frame or ways have affixed thereto a stationary rack 13. This rack 13 has the teeth 14 for meshing with a pinion 15. Screws or other fastenings 16 are employed to hold the stationary rack 13 to the lathe frame. These fastenings are preferably removable so that the improved attachment may be mounted upon and removed from any existing form of lathe. The pinion 15 is affixed, as by a pin 17, to a shaft 18. The shaft 18 is carried in a bearing 19 of a housing 20. This housing is supported, as by a bracket 21, from the tool holder 11 and goes back and forth with this tool holder. Within the housing is disposed a bevel gear 22 pinned or otherwise affixed to the shaft 18 and disposed in mesh with a pinion 22' fixed upon an indicating shaft 23. The indicating shaft projects up through a bearing 24 in the upper neck of the housing 20. The upper end of the shaft 23 projects above the bearing 24 and receives thereon a rotatable dial 25 having a depressed bearing hub 26 made fast to the shaft 23 as by a removable screw 27.

The depressed hub 26 is adapted to seat upon a restricted bearing surface 28 of the housing or bearing sleeve 24. Extending about the bevelled and subdivided edge 29 of the dial 25 is a bevelled ring 30 which may be adjusted about a rim 31 at the upper end of the housing 20.

Figure 2:
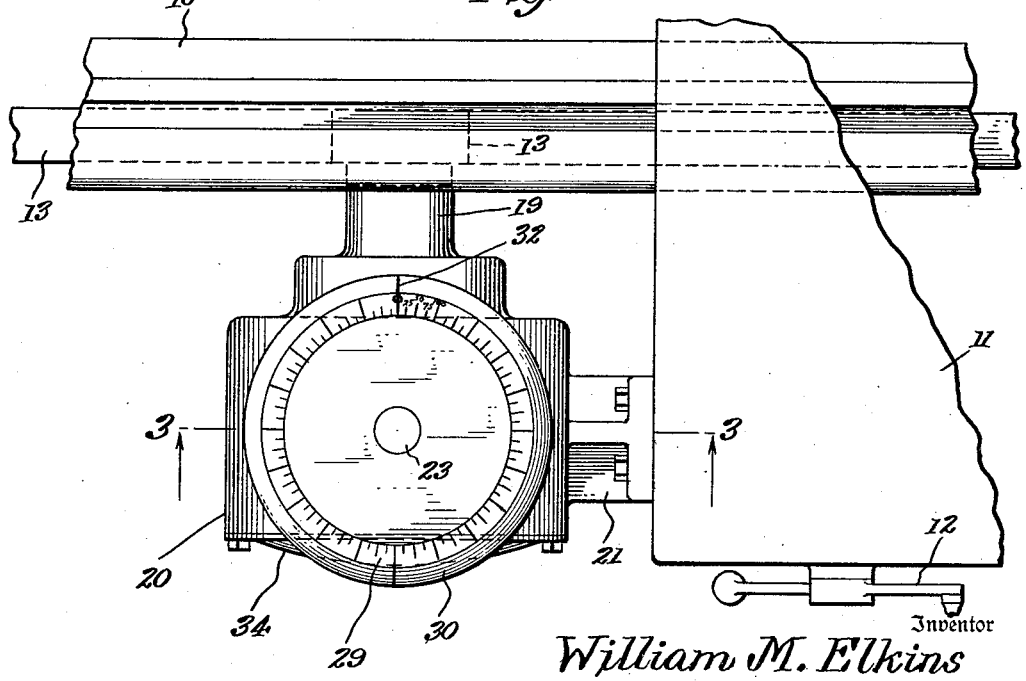
Figure 2 is a top plan view of the same.

In Figure 2 are shown the subdivisions at the bevelled margin of the dial, and there is also shown an indicating line 32 on the adjustable ring 30. The ring is adjustable by means of a set screw 33.

A removable plate 34 for the front opening of the housing 20 protects the gears from dust and foreign matter and also retains the lubricant in the casing.

The outside ring 30 may be adjusted circumferentially so that the indicating line 32 may be set at any desired angle and locked in that position by the set screws 33.

The graduations of the dial 25 will preferably be so spaced so as to read one-half inch travel of tool holder 11 to one-half revolution of the dial 25.

In use, the tool holder 11 is moved by the hand wheel 12 in the usual manner, and as it goes it will draw along with it the housing 20, which will cause the pinion 15 to progress along the rack 13 thereby rotating the shaft 18 and the pinions 22 and 22', which causes the rotation of the dial 25. This disc or graduated dial 25 will accurately indicate the amount of travel of the tool holder 11.

It will be noted that there is a positive connection due to the rack 13 and pinion 15 so that no slippage may occur, which slippage would of course, induce lack of accuracy.

It will also be apparent that the improved attachment is installed and mounted in a position that is accessible to the operator's eye. The device need not be installed by the manufacturers of the machine requiring a factory job, but the attachment is such that it can be readily attached and detached and can be changed, if desired, from one lathe to another.

It is also to be noted that I do not employ the standard lathe rack, which becomes worn after a few months' use and is apt to be therefore untrue.

It will be understood that the rack usually found on the lathe may be used as a part of this attachment, but for reasons already stated, it is preferred to provide the separate rack shown in the drawings.

It will be obvious that various changes in the construction, combination and arrangement of parts could be made, which could be used without departing from the spirit of my invention, and I do not mean to limit the invention to such details, except as particularly pointed out in the claim.

Having thus described my invention, what I claim and desire to secure by Letters Patent of the United States is:—

An indicator for lathes having a fixed frame and a travelling tool holder, comprising a hollow housing adapted to be mounted on the tool holder and to travel therewith, a pair of axially intersecting shafts in the housing, intermeshing bevel gear wheels carried by the shafts and proportioned in desired ratio with respect to the relative turning of the shafts, a pinion fixed on one shaft, a longitudinal rack adapted to be mounted on the fixed frame of the lathe in position to mesh constantly with said pinion for turning the shafts upon movement of the tool holder, said second shaft projecting upwardly through said housing, a graduated upwardly faced dial fixed upon the upper end of the shaft above the housing in proximity to the upper face of the tool holder and positively driven by the shaft, and an adjustable indicating ring carried by the housing and surrounding the marginal edge portion of the dial.

WILLIAM M. ELKINS.